Figure 1:
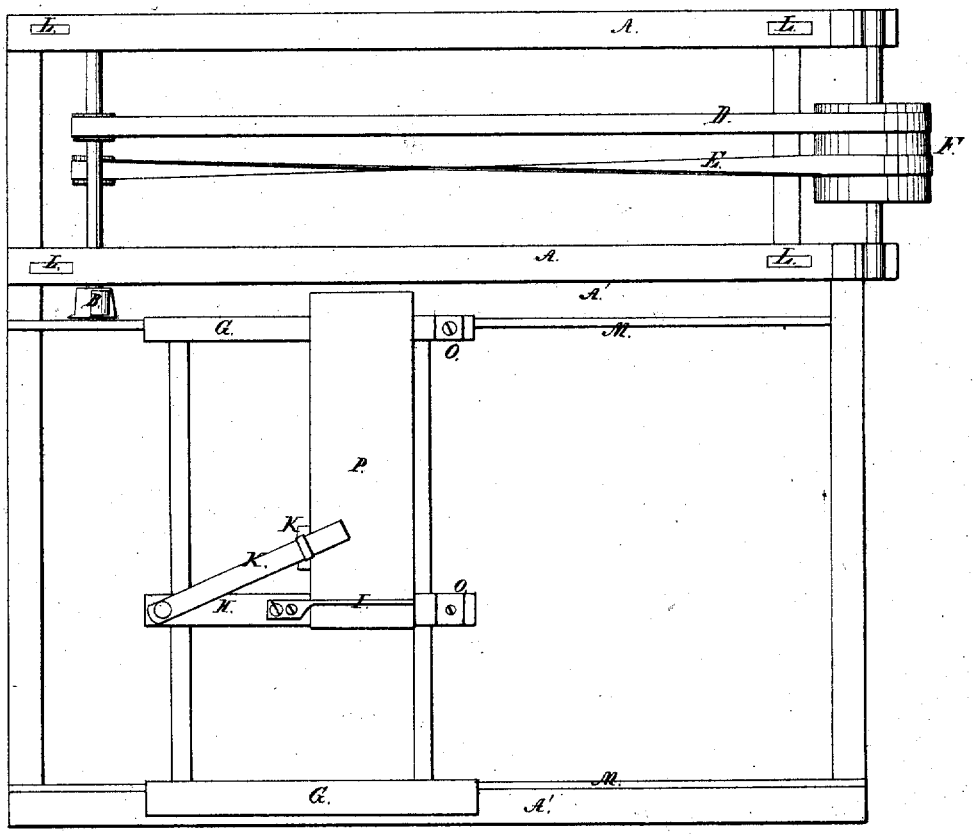
Figure 2:
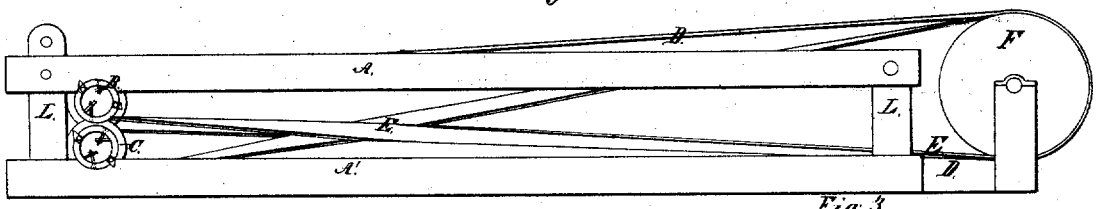
Figure 3:
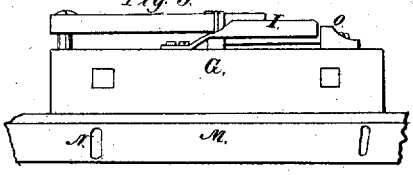
Figure 4:
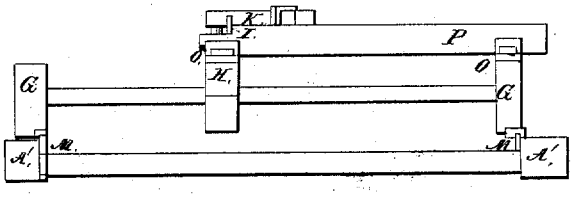

6737X

J. Fay,

Tenoning Machine.

Patented Aug. 29, 1831.

AM. PHOTO-LITHO. CO. N.Y. (OSBORNE'S PROCESS)

Aug 29 1831

6737X Josiah Fay, Hollis New Hampshire

Letters Patent

The Schedule referred to in these Letters Patent and making part of
the same containing a description in the words of the said Josiah Fay him
self of his improvement in the art of cutting tenons by revolving cylinders To all to whom these presents shall come. Be it known that I
Josiah Fay of Hollis in the County of Hillsborough and State of New Hamp
shire have invented a new and useful improvement in the art of cutting ten
ons by revolving cylinders and that the following is a full and exact
description of the construction of my discovery or invention together with
a frame necessary to contain the same — The machine consists of a frame
forty two inches long and twenty inches wide to contain the lower cylinders
directly over that is another frame of the same size to contain the upper cylin
der. and connected together at the ends by studs. The studs are made fast
to the lower frame. The upper frame is confined to the said Studs at one end by
a joint five and a half inches from the lower frame. The other end of the upper
frame may be raised or lowered as the thickness of the tenon to be cut
may require. and made fast by bolts that play in slits of said studs.
The size of timber suitable for the frames is three by four inches and
confined together by joint bolts. The cylinders are of cast iron seven
inches in diameter at the face end and about one eighth of an inch less
at the [illegible] end — They are three inches long and placed in the frames one
directly over the other in nearly or horizontal position inclining a little
towards each other at the [illegible] end. so as to bring their surfaces at a
parallel distance. They are supported in the frames by wrought iron
shafts turning upon pivots or centres. In each cylinder are two plane
irons protruding through and set transversely with the surface of the cyl
inders and made fast by bolts and screws. at the face end and upon the
edge of each cylinder are two spurs fastened by iron keys to cut the shoul
ders of the tenons which may be cut directly opposite or be varied by moving forward the top cylinder as the nature and kind of the work may
require. Upon each Shaft is a wheel four inches in diameter for the band
to run upon to put the cylinders in motion. They run in opposite directions
by crossing the band on one wheel. Connected with the lower frame above
described by two pieces of timber three and an half feet long is a sill of
the same length placed parallel with said frame. To this sill as well as
to the sill of the frame to which this is connected are cast iron ways
which may be raised or lowered by screws or keys so as to cut the shoulders
to any required depth these ways are confined to the sills by bolts playing
in slits. The carriage is a frame corresponding in length with the
ways and about two feet wide the end pieces of said carriage are one
and a half by three inches connected by two or more slats one inch thick
and four inches wide. Upon the under side of the end pieces of said carriage
are cast iron slides and at the end next the cylinders the slides are groov-
ed so as to conform to the ways and to govern the carriage in its movement.
On the slats above mentioned is a moveable slide consisting of two pieces one
inch thick and four inches wide confined together by screws with two or
more grooves through it ~~and~~ corresponding with and for the slats to play
in. This slide will move towards and from the cylinders as the length
of the timber to be tenoned requires. about the centre of the slide is fas-
tened a spring with a perpendicular shoulder to keep the timber in
its place lengthwise and to give the proper length between ~~of~~ the shoulders of the
tenons. On the end of the carriage next to the cylinders and on the slide
above described are two moveable blocks confined by screws to prevent
the timber to be tenoned from moving sideways. At the forward
side of the carriage on the end of the slide is a perpendicular pin or
screw about four inches long upon which turns a [illegible] sixteen
inches long with a moveable hold fast upon it to confine the timber
against the blocks above described. Upon this carriage the timber to
be tenoned being placed secured in its place as above mentioned
and the cylinders being put in motion by water or other power. the
end of the timber to be tenoned by a little manual exertion in shoving
it forward passes at any given distance desired between the cylinders 6737X Aug 29, 1831 the spurs cut the shoulders and on the plane irons cut the surfaces of the
tenons leaving them perfectly fine & smooth. The principle of this invention or
discovery is to cut tenons by revolving cylinders. And your petitioner has
contemplated it as suitable to be applied to the cutting of mortices.
Your petitioner claims the ~~invention~~ improvement of cutting tenons by revolving cylin
ders as an invention or discovery of his own.

Witnesses
Jacob Fisher Junr
Moses Smith

Josiah Fay

[illegible] W.H.

(952 words)